March 4, 1924.
M. A. HERRO
EXPANSION REAMER
Filed Jan. 16, 1923
1,485,610
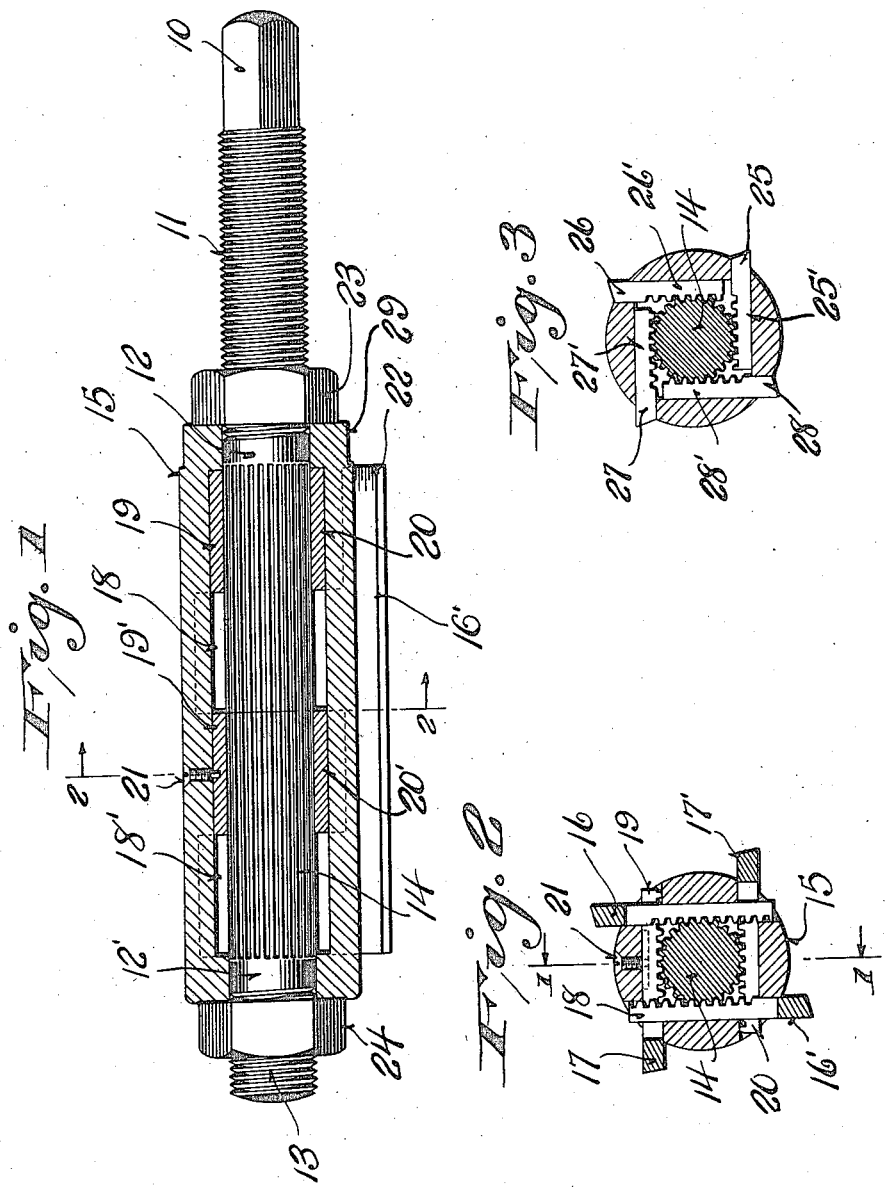
Inventor:
Moses A. Herro Patented Mar. 4, 1924.

1,485,610

UNITED STATES PATENT OFFICE.

MOSES A. HERRO, OF OCONOMOWOC, WISCONSIN.

EXPANSION REAMER.

Application filed January 16, 1923. Serial No. 612,896.

*To all whom it may concern:*

Be it known that I, MOSES A. HERRO, a citizen of the United States, and resident of Oconomowoc, in the county of Waukesha and State of Wisconsin, have invented certain new and useful Improvements in Expansion Reamers; and I do hereby declare that the following is a full, clear, and exact description thereof.

This invention comprises a plurality of reamer blades, provided with rack portions, a holder for the blades, a spindle having a gear portion for advancing the blades from the holder and means for locking the blades in adjusted position.

The primary object of the invention is convenience and rapidity of adjustment. The movement of the blades outwardly is effected by the mere rotation of the spindle with respect to the blade holder. The teeth on the spindle meshing with those on the blades, operates on rotation of the spindle to advance all of the blades an equal extent, so that the edges of the blades lie on the surface of an imaginary cylinder and are disposed for effective reaming action.

An object of the invention is the effective securing in position of the blades. The cylindrical holder is provided with a recess for each of the blades and nuts are threaded on the spindle and are effective to lock it rigid with the holder, so that the blades are securely positioned and maintained against movement in any direction with respect to the holder.

An object of the invention is the provision of means by which the extent of extension of the blades can be immediately determined. One or more of the blades is provided with graduations which may be inspected to determine the distance of projection of the blade from the holder. In this manner, the diameter of the bore in which the blades are operative in adjusted position is determined at once.

A still further object of the invention is the provision of a construction which makes possible a maximum extensibility of the blades, so that the reamer is operative in a bore of large diameter. When the blades are in their most retracted position, considerable lengths of rack portions are disposed on both sides of the spindle. Consequently, upon the rotation of the spindle a considerable length of rack portion for each blade is available, so that the blade may be advanced a considerable distance.

With the above and other objects in view, which will appear as the description proceeds, the invention resides in the novel construction, combination and arrangement of parts substantially as hereinafter described and more particularly defined by the appended claim, it being understood that such changes in the precise embodiment of the herein disclosed invention may be made as come within the scope of the claim.

In the accompanying drawing is illustrated one complete example of the physical embodiment of the present invention constructed according to the best mode so far devised for the practical application of the principles thereof.

Figure 1 is a longitudinal section on the line 1—1 of Figure 2.

Figure 2 is a section on the line 2—2 of Figure 1.

Figure 3 is a section showing a modified form of reaming blade.

The spindle comprises a rectangular portion 10 adapted to be inserted into a chuck for gripping a portion of a tool suitable for rotating the reamer, an adjacent threaded portion 11, spaced cylindrical portions 12—12', and a threaded portion 13 at the end and a gear portion 14, extending between cylindrical portions 12—12'. A holding cylinder 15 envelops the gear portion 14 and fits about cylindrical portions 12—12'. The cooperative relationship of the cylindrical portions and the holder is such that there is no possibility of wobbling of the holder and cylinder. No lateral movement of any part thereof, with respect to the spindle, is possible. In other words, due to the four point cutting action of the reamer, irregular boring or angular distortion of the bored hole will not result as frequently happens in a two blade reamer.

Blades 16—16', which are substantially identical and blades 17—17' which are substantially identical, are provided, the holding cylinder having a recess for each of the blades, the blades having a sliding fit in the recess. Each of the blades is beveled at the recess. Blades 16 is provided with its cutting edge. Blades 16 is provided with a pair of smaller rack portions 18—18', rectangular in shape and spaced apart. Between the rack portions 18—18' the blade extends in a relatively narrow strip. It extends also in a relatively narrow strip beyond rack portion 18. The blade 16 is provided with rack portions similar to those of blade 16'. Knife 17 is provided with rack portions 19—19' and blade 17' is provided with rack portions 20—20'. Rack portions 19 and 20 are spaced from rack portions 19' and 20', respectively, so as to receive therebetween rack portions of blades 16—16'. Rack portions 16—16' are spaced apart to receive therebetween portions 19'—20'. In adjusting the blades, the spindle is rotated with respect to the holder 15 and the meshing teeth of the rack portions and gear portion 14 are operated to move outwardly the blades. Obviously, the advancement of all of the blades is equal, so that the edges are at all times disposed on the surface of an imaginary cylinder, and an effective reaming action is insured. The surfaces of the rack portions farthest from the spindle are smooth, so that they slide freely over the contiguous portions of the holding cylinder. The rack portion 19' is provided in its outer surface with a groove for the reception of the end of a screw 21, which operates to limit the outward movement of blade 17. When the outward movement of the knife 17 is stopped, blades 16—16' and 17' are also stopped as the spindle is prevented from further rotation.

Blade 16' is provided at one end with graduations 22, extending from the edge of the blade to the surface of the cylinder. These graduations may be inspected to determine the degree of extension of the blade, or in other words, the diameter of the bore in which the instrument is designed to effectuate reaming action. By the mere rotation of the spindle the operator is enabled to extend the blades to a desired degree. As the rack portions of the blade are spaced apart, the edge of the blade is held outward rigidly, so that there is no possibility of deflection inwardly of any portion of the blade. If desired, graduations may be made on each of the blades.

After the blades are adjusted to a proper position, nut 23 on threaded portion 11 and nut 24 on threaded portion 13 are caused to approach so as to effectively grip the ends of the cylinder and lock the blades rigidly in position. To again adjust the instrument, it is merely necessary to loosen one of the nuts, rotate the spindle to the desired extent and again tighten the nut.

As is apparent from Figure 2, a considerable length of the rack portions lies on each side of the spindle, so that on the rotation of the spindle, the blades may be advanced a very considerable distance. The arrangement of the rack portions in suchwise as to straddle each other, results therefore in a minimum extensibility, as it permits the rack portions of one blade to cross the rack portions of two other knives.

In the modification shown in Figure 3, blades 25, 26, 27 and 28 are provided with rack portions 25', 26', 27' and 28' respectively, each of the rack portions being coextensive with its blade and uninterrupted. Obviously, the blades of Figure 3 cannot be extended so far as those in the modification of Figures 1 and 2, as the rack portions have not sufficient width.

In both of the modifications, the blades are secured rigidly in position and disposed at all times with their edges in effective reaming position.

I claim:

An expansion reamer comprising a holder having a cylindrical opening therethrough and having four pair of slots extending from said opening outwardly, said pairs of slots being arranged successively at right angles to each other, a spindle in said opening having elongated gear teeth upon the portion enclosed by said holder, said spindle having threaded ends projecting beyond said holder, nuts upon said threaded ends adapted to lock said spindle relative to said holder, and four elongated cutting blades projecting from said holder and each having a pair of inwardly extending spaced arms positioned in said slots provided with rack teeth meshing with said gear teeth, the arms of one blade intermeshing with the arms of the succeeding blade, whereby said blades may be greatly extended and whereby said blades are supported at spaced points.

In testimony that I claim the foregoing I have hereunto set my hand at Milwaukee, in the county of Milwaukee and State of Wisconsin.

MOSES A. HERRO.